United States Patent
Duran Hernandez et al.

(10) Patent No.: US 9,827,926 B2
(45) Date of Patent: Nov. 28, 2017

(54) COWL TRIM ASSEMBLY WITH SLIDING COVER

(71) Applicant: FORD GLOBAL TECHNOLOGIES, LLC, Dearborn, MI (US)

(72) Inventors: Luis Alberto Duran Hernandez, Mexico City (MX); Ramiro Chable Hernandez, Cuautitlan Izcalli (MX); Hallin Sinai Hernandez Moreno, Adolfo Lopez Mateos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/930,837

(22) Filed: Nov. 3, 2015

(65) Prior Publication Data

US 2017/0120848 A1    May 4, 2017

(51) Int. Cl.
*B60R 16/023* (2006.01)
*B60R 7/06* (2006.01)
*B60R 11/00* (2006.01)

(52) U.S. Cl.
CPC ............ *B60R 16/0239* (2013.01); *B60R 7/06* (2013.01); *B60R 2011/0003* (2013.01)

(58) Field of Classification Search
CPC ... B60R 2011/0264; B60R 11/02; B60R 7/04; B60R 7/06; B60R 7/046; B60R 2011/0003; B60R 2011/00; B60R 16/02395; B60N 3/08; B60N 3/083; B60K 37/00; B62D 25/14
USPC .............................. 296/37.8–37.13
See application file for complete search history.

(56) References Cited

U.S. PATENT DOCUMENTS

| | | | |
|---|---|---|---|
| 3,639,882 A * | 2/1972 | Honda | B60K 37/02 337/188 |
| 4,371,743 A | 2/1983 | Decker | |
| 6,120,077 A * | 9/2000 | Westphal | B60R 7/046 296/37.13 |
| 6,576,838 B2 | 6/2003 | Matsumura | |
| 6,669,258 B1 * | 12/2003 | Kato | B60N 3/083 296/1.01 |
| 6,850,421 B2 | 2/2005 | Boyd | |
| 8,465,076 B1 * | 6/2013 | Quijano | B60R 7/04 296/24.34 |
| 2002/0030375 A1 * | 3/2002 | Eguchi | B60R 7/04 296/37.8 |

(Continued)

FOREIGN PATENT DOCUMENTS

| | | |
|---|---|---|
| DE | 3309757 C2 | 5/1990 |
| JP | 2009095190 A | 4/2009 |

OTHER PUBLICATIONS

English machine translation of DE3309757C2.
English machine translation of JP2009095190A.
"Fuses"; pp. 1974-202.

*Primary Examiner* — Gregory Blankenship
(74) *Attorney, Agent, or Firm* — Vichit Chea; King & Schickli, PLLC

(57) ABSTRACT

A cowl trim assembly is provided. That cowl trim assembly includes a panel and a sliding cover carried on the panel. More specifically, the panel includes a slide track and the sliding cover includes a follower for engaging the slide track. A finger hold is provided in a face of the sliding cover to provide a point of engagement for opening the sliding cover from the closed position.

6 Claims, 4 Drawing Sheets

(56) References Cited

U.S. PATENT DOCUMENTS

2008/0150309 A1\* 6/2008 Norman ................... B60R 7/04
  296/37.8
2009/0071682 A1  3/2009 Crawford, Jr.
2009/0072568 A1\* 3/2009 Luginbill ................. B60R 7/04
  296/37.8
2009/0096240 A1\* 4/2009 Hanzel .................... B60N 3/08
  296/37.8

\* cited by examiner

COWL TRIM ASSEMBLY WITH SLIDING COVER

TECHNICAL FIELD

This document relates generally to the motor vehicle equipment field and, more particularly, to a cowl trim assembly incorporating a sliding cover to allow access to an otherwise concealed compartment that may hold, for example, a fuse box and/or a body control module.

BACKGROUND

In some motor vehicle models, it is desired to locate the fuse box or the body control module (BCM) beneath the instrument panel console adjacent the foot well behind a removable cover of the cowl trim. In the past such a cover has been held in place by means of snap fasteners because the fuse box must be accessible to a vehicle operator without any tools. On right hand drive vehicles, the accelerator pedal is positioned adjacent this cover with very limited clearance making it very difficult to remove the cover to access the fuse box or the BCM.

This document relates to a new and improved cowl trim assembly incorporating a sliding cover that may be easily opened to access the compartment behind the cover and any components such as a fuse box or BCM carried therein. Advantageously, the sliding cover is easily opened even on right hand drive models where the accelerator pedal provides limited clearance for access.

SUMMARY

In accordance with the purposes and benefits described herein, a cowl trim assembly is provided. That cowl trim assembly comprises a panel including a slide track and a sliding cover carried on the panel. The sliding cover includes a follower engaging the slide track.

In one possible embodiment, the cowl trim assembly further includes a finger hold in a face of the sliding cover. That finger hold may be provided adjacent the follower along the bottom edge of this cover.

In one possible embodiment, the slide track includes a rail and an end stop. In such an embodiment, a follower may include a channel that is received over and rides along the rail.

Still further the sliding cover may include at least one securing tab along a first edge thereof and the panel may include a tab receiver that holds the securing tab when the sliding cover is in a closed position.

Further, the sliding cover may include a resilient latch and the panel may include a cooperating striker. The resilient latch may be located on a second edge of the sliding cover opposite the first edge.

In one particularly useful embodiment, the cover conceals a compartment when in a closed position. That compartment may hold a fuse box or a body control module.

In accordance with an additional aspect, a cowl trim assembly is provided comprising a panel defining an access opening and a sliding cover carried on the panel enclosing the access opening when in a closed position. That cowl trim assembly may further include a finger hold in a face of the sliding cover. Further that cowl trim assembly may include a resilient latch for securing the sliding cover in a closed position.

A fuse box may be provided in the access opening. In another possible embodiment, a body control module is provided in the access opening.

In the following description, there are shown and described several preferred embodiments of the cowl trim assembly. As it should be realized, the cowl trim assembly is capable of other, different embodiments and its several details are capable of modification in various, obvious aspects all without departing from the cowl trim assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cowl trim assembly and together with the description serve to explain certain principles thereof. In the drawing figures.

Figure 1:
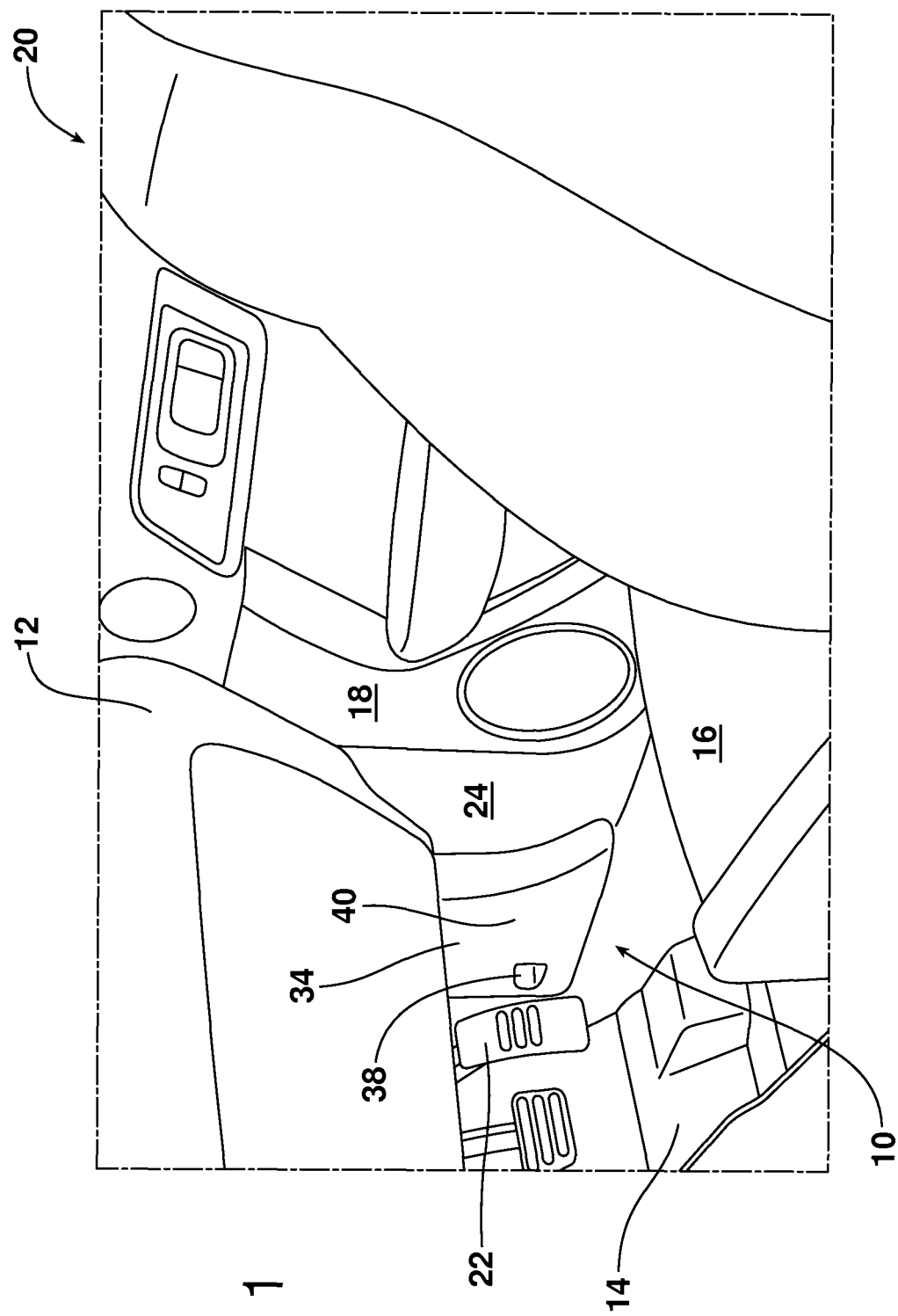
FIG. 1 is a perspective view of a right hand drive motor vehicle incorporating the cowl trim assembly that is the subject matter of this document. The steering wheel is removed for clarity of illustration.

Reference will now be made in detail to the present preferred embodiments of the cowl trim assembly, examples of which are illustrated in the accompanying drawing figures.

DETAILED DESCRIPTION

Reference is now made to FIGS. 1-3b illustrating the cowl trim assembly 10. As illustrated, the cowl trim assembly 10 is located beneath the instrument panel console 12 adjacent to foot well 14 forward of the front seat 16 and the front door 18. As should be appreciated, the motor vehicle 20 of the illustrated embodiment is a right hand drive motor vehicle. Thus, the accelerator pedal 22 is located adjacent the cowl trim assembly 10.

Figure 2:
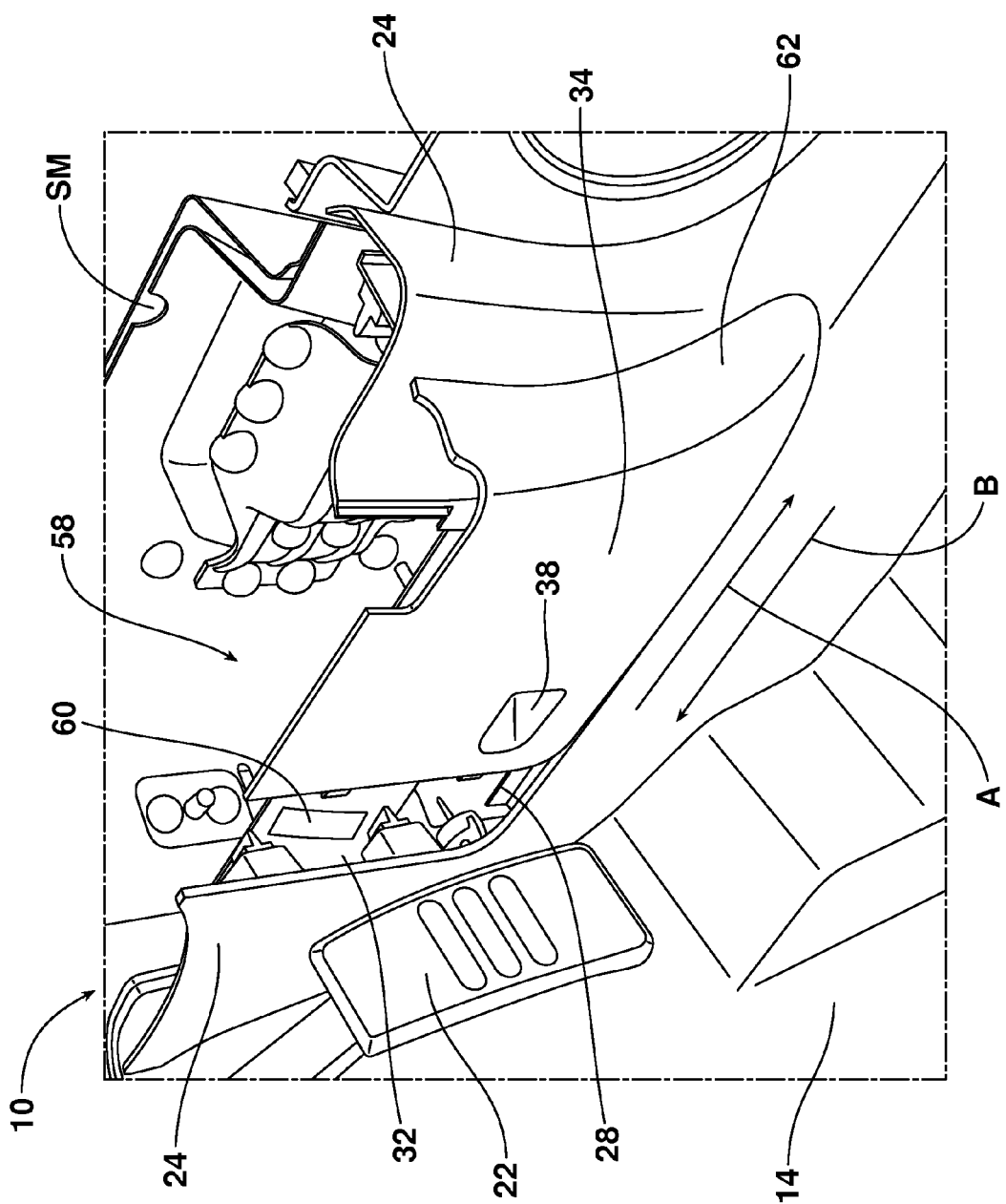
FIG. 2 is a detailed perspective view illustrating the cowl trim assembly with the sliding cover in the open position.
Figure 3A:
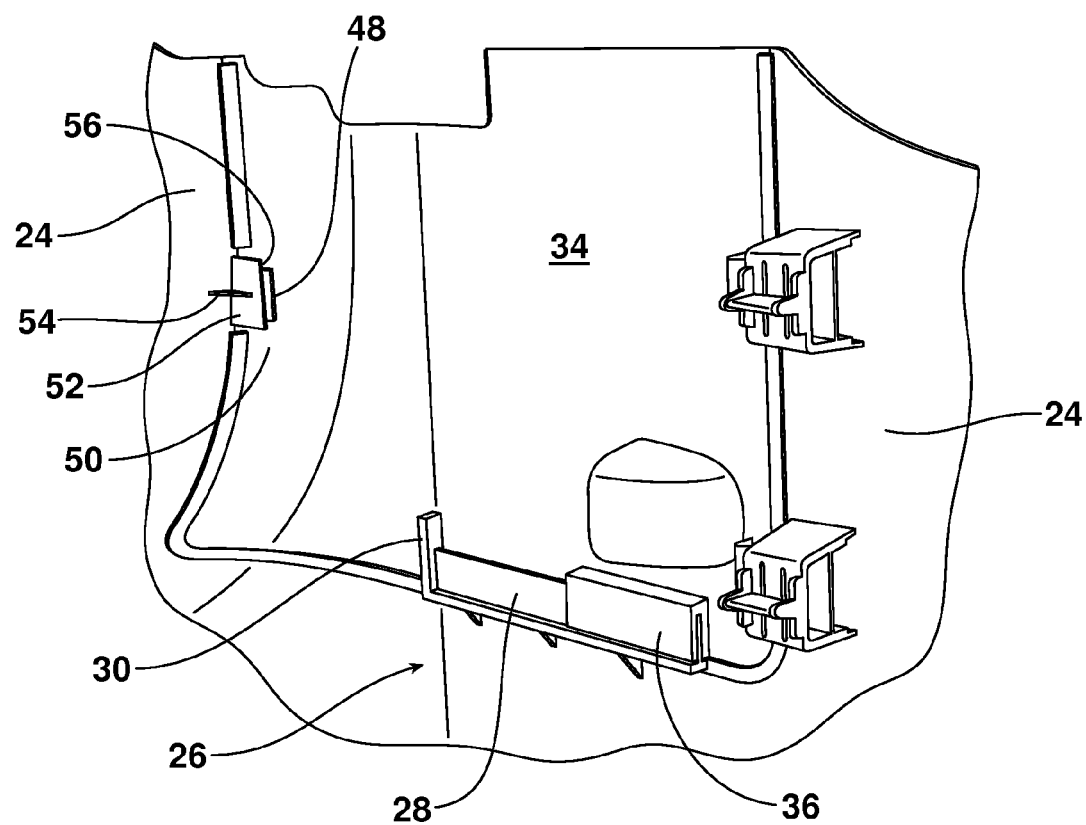
FIGS. 3a and 3b are respective rear perspective views of the cowl trim assembly with the sliding cover in the closed and opened positions.
Figure 3B:
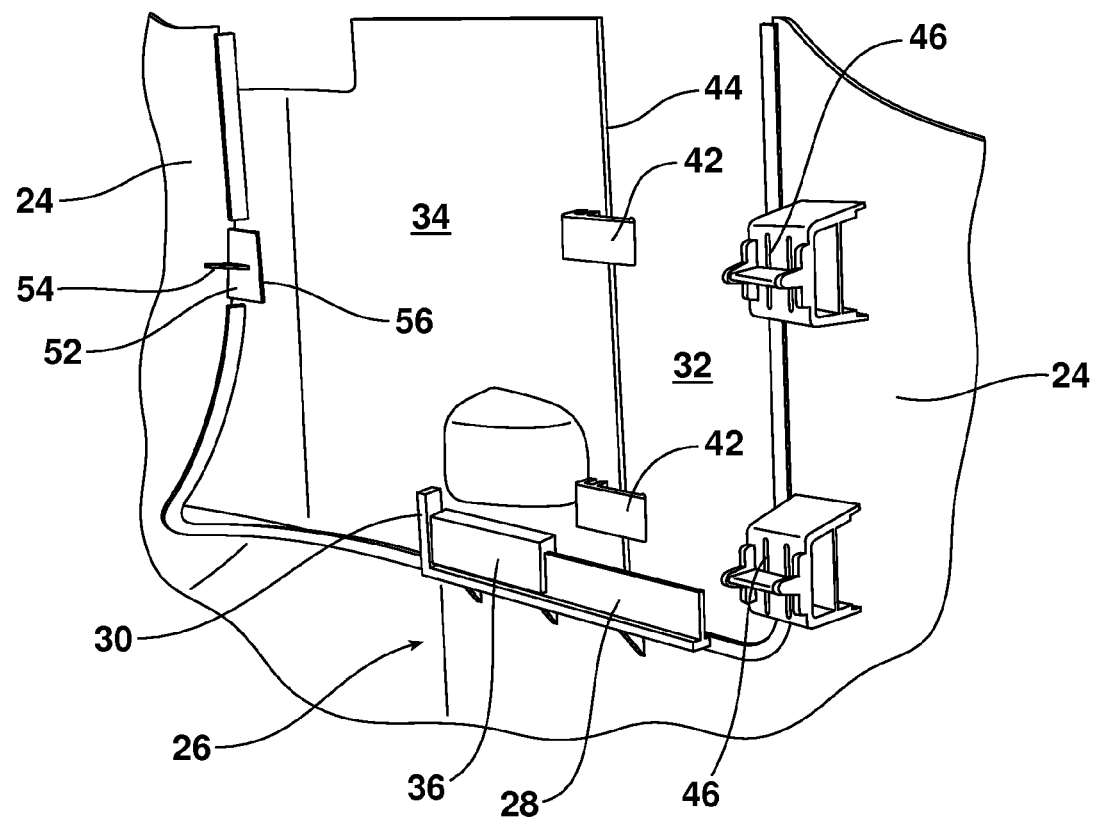

As best illustrated in FIGS. 2, 3a and 3b, the cowl trim assembly 10 includes a side panel 24 that is fixed to the sheet metal SM of the motor vehicle 20. As illustrated, the side panel 24 includes a slide track, generally designated by reference numeral 26. That slide track includes a vertically oriented rail 28 and an end stop 30. As should be appreciated, the slide track 26 is provided at the bottom of the access opening 32 formed by the side panel 24.

As further illustrated, the cowl trim assembly 10 also includes a sliding cover 34 carried on the side panel 24. The sliding cover 34 includes a follower 36 for engaging the slide track 26. In the illustrated embodiment, the follower comprises a channel that receives the rail 28.

As best illustrated in FIG. 2, the sliding cover 34 also includes a finger hold 38 in the face 40 of the sliding cover. FIGS. 1 and 3a illustrate the sliding cover 34 in the closed position. FIGS. 2 and 3b illustrate the sliding cover in the open position.

As best illustrated in FIGS. 3a and 3b, the sliding cover 34 also includes two securing tabs 42 positioned along a first edge 44 of the cover. The side panel 24 includes two cooperating tab receivers 46. When the sliding cover 34 is in the closed position, the tabs 42 are received and held in the tab receivers 46 and function to hold the first edge 44 of the sliding cover flush with the side panel 24. A latch mechanism secures the sliding cover 34 in the closed position. That latch mechanism includes a locking rib 48 carried on the inner surface 50 of the sliding cover 34 and a cooperating resilient latch 52 projecting from an edge of the panel 24. The resilient latch 52 is oriented so as to be opposed to the tab receivers 46 on the opposite side of the opening 32. A reinforcing rib 54 supports the resilient latch 52. When the sliding cover 34 is closed, the distal end 56 of the latch 52 engages the rib 48 (see FIG. 3*a*).

When one wants to open the sliding cover 34 to expose the access opening 32, one positions one or more fingers in the finger hold 38 and applies a force in the direction of action arrow A as illustrated in FIG. 2. When sufficient force is so applied, the resilient latch 52 releases the locking rib 48 and the sliding cover 34 slides open in the direction of action arrow A until the follower 36 engages the end stop 30 of the slide track 26 (see FIG. 3*b*). When the cover 34 is opened, one can easily access the compartment 58 that is concealed behind the cover when the cover is in a closed position. In one possible embodiment, that compartment holds a fuse box. In another possible embodiment, that compartment 58 holds a body control module (BCM). As is known in the art, a body control module may comprise a computer that performs a number of interior body electrically based functions including, for example, interior locking, remote key entry, interior light, exterior light, windshield wiper control and the like. In some embodiments, the body control module may also function to control entertainment functions (e.g. radio, CD player and communications such as telephone and internet communications over a wireless network). In the illustrated embodiment, the schematic box 58 represents the fuse box or the body control module.

When one wishes to close the sliding cover 34, one simply engages the finger hold 38 or the rear face 62 of the side panel 24 and pushes in the direction of action arrow B as illustrated in FIG. 2. The sliding cover 34 then slides along the rail 28 until the tabs 42 are fully received and seated in the tab receivers 46 and the resilient latch 52 engages the locking rib 48 securing the sliding cover in the closed position enclosing the access opening 32.

It should be appreciated that the sliding cover 34 of the cowl trim assembly 10 may be easily opened and closed even for a right hand drive vehicle where the accelerator pedal 22 is located adjacent to the cover and limits clearance. It should further be appreciated that the sliding cover 34 is securely held in the closed position by a combination of features including the tabs 42 engaged in the tab receivers 46, the follower/channel 36 of U-shape that is received over the rail 28 and the resilient latch 52 that engages the locking rib 48. Thus, any risk of inadvertently knocking the sliding cover 34 free of the side panel 24 by an inadvertent kick with a foot is substantially eliminated.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cowl trim assembly, comprising:
a panel including a slide track and a cooperating striker, wherein said slide track includes a rail and an end stop; and
a sliding cover carried on said panel, wherein said sliding cover includes a resilient latch, at least one securing tab along a first edge thereof, and a follower engaging said slide track, wherein said follower includes a channel that receives said rail, wherein said panel includes a tab receiver that holds said at least one securing tab when said sliding cover is in a closed position, and wherein said resilient latch is located on a secured edge of said sliding cover opposite said first edge.

2. The cowl trim assembly of claim 1, further including a finger hold in a face of said sliding cover.

3. The cowl trim assembly of claim 2, wherein said finger hold is adjacent said follower.

4. The cowl trim assembly of claim 1, wherein said cover conceals a compartment when in said closed position.

5. The cowl trim assembly of claim 4, wherein said compartment holds a fuse box.

6. The cowl trim assembly of claim 5, wherein said compartment holds a body control module.

\* \* \* \* \*